United States Patent [19]

Bates

[11] 4,170,247
[45] Oct. 9, 1979

[54] POLYFLUOROCARBON CONDENSER PLUG

[76] Inventor: John Bates, 3856 New Hope Rd., Grants Pass, Oreg. 97526

[21] Appl. No.: 844,795

[22] Filed: Oct. 25, 1977

[51] Int. Cl.² ............................................. F16L 55/10
[52] U.S. Cl. ........................................ 138/89; 202/242
[58] Field of Search ................. 138/89, 96 R, 96 T; 285/239, 162, 249, 142; 16/108; 220/235, 237; 202/242

[56] References Cited

U.S. PATENT DOCUMENTS

| | | | |
|---|---|---|---|
| 3,434,746 | 3/1969 | Watts | 285/162 |
| 3,606,073 | 9/1971 | Burke | 138/96 T |
| 3,656,783 | 4/1972 | Reeder | 285/239 |
| 3,814,135 | 6/1974 | Hetzer et al. | 138/89 |
| 3,830,531 | 8/1974 | Burge | 285/249 |
| 3,964,339 | 6/1976 | Antonio et al. | 138/96 R |

Primary Examiner—Lenard A. Footland
Attorney, Agent, or Firm—J. L. Jones, Sr.

[57] ABSTRACT

A condenser plug for a leaky condenser tube has a cylindrical external fluorocarbon tube body with an integral plug base and a flanged lip, a threaded bolt coaxially fixedly integrally secured wholly within the cylindrical external body and the plug base, and a non-rotatable bolt head permanently anchored in the plug base. A cooperative metal expander bolt has a tapered external cylindrical contour and a coaxial internal threaded sleeve with a flat metal cap. On threading the metal expander sleeve on to the fixed threaded bolt, the tapered expander bolt seats in the annular cylinder volume between the threaded bolt and the fluorocarbon plug body, expanding and extruding the plug body to firmly secure the plug body in the condenser tube. The tube leak is sealed between two condenser plugs disposed at the two opposed condenser tube ends secured in the pair of condenser sheets.

3 Claims, 4 Drawing Figures

POLYFLUOROCARBON CONDENSER PLUG

BACKGROUND OF THE INVENTION

The polyfluorocarbon condenser plug of this invention is classified in Classes 285/239, 285/162, 285/142 and the like.

Burge, in U.S. Pat. No. 3,830,531 issued Aug. 20, 1975, discloses a coupling for a flexible tube in which a removable tube support is mounted in the coupling body. The support has a radial flange at its inner end, butting against a stop shoulder in the coupling body, and has circumferentially spaced fingers connected to the flange and doubled back over the support and which are radially yieldable to provide a press fit within the body bore. In U.S. Pat. No. 3,656,783 issued Apr. 18, 1972, Reeder discloses a transition connection for metal to plastic pipe wherein the plastic pipe is cold-extruded to form a sealed connection. Further, in U.S. Pat. No. 3,525,661 issued Aug. 18, 1970, Farnam discloses a connection for metal and plastic pipe, wherein the plastic pipe is cold extruded in the threads and grooves of the steel pipe. Knapp in U.S. Pat. No. 3,467,764 issued Sept. 16, 1969, discloses an electric conductive rubber layer of a hose connected to a zinc or cadmium containing fitting by means of an adhesive cobalt compound dissolved in rubber and the like.

SUMMARY OF THE INVENTION

A leaking condenser tube is sealed off from the remaining condenser tubes by a pair of condenser plugs disposed and sealing both ends of the leaky condenser tube. A single condenser tube plug has a cylindrical external polyfluorocarbon tube body with an integral plug base and a flat flanged lip oppositely disposed to the plug base. A threaded bolt is coaxially disposed and fixedly secured inside the cylindrical plug body, and a non-rotatable bolt head is permanently anchored in the plug base. There is an open annular cylindrical volume between the polyfluorocarbon body and the coaxial threaded bolt. A cooperative metal expander bolt has a tapered external cylindrical contour, a coaxial internal threaded sleeve, and a flat flanged bolt cap adapted to compress the flat flanged lip of the polyfluorocarbon tube body. On threading the internal threaded sleeve onto the threaded bolt integrally secured in the tube body, the expander seats in the annular volume between the tube body and the coaxial bolt, expanding and extruding the tube body and firmly securing the plug body in the condenser tube, sealing one end of a leaky condenser tube.

Include in the objects of this invention are:

To provide an easily applied plug for a condenser tube in a steam condenser, or the like.

To provide a plug for a condenser tube which does not provide an electrolysis inducing action in a condenser tube-plug joint.

To provide an easily applied condenser tube plug which does not damage the tube sheet during application.

To provide a condenser plug which can be effectively expanded and extruded to plug a leaky condenser tube.

Other objects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT OF THE INVENTION

Figure 1:
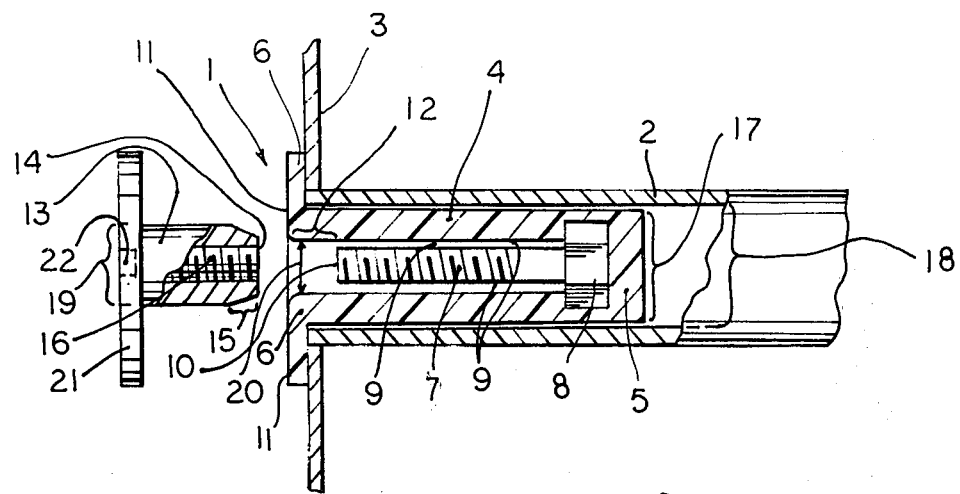
FIG. 1 is a partial sectional elevational view of the polyfluorocarbon condenser plug of this invention disposed in a condenser tube, prior to the plug expansion.

Referring to FIG. 1 in detail, a polyfluorocarbon condenser plug 1 is shown preliminarily slidably seated in a leaky cylindrical condenser tube 2, the tube 2 being disposed in a tube sheet 3. The condenser plug 1 has a cylindrical external polyfluorocarbon tube body 4 with an integral plug base 5, and an integral flat flange lip 6 oppositely disposed to the plug base 5. A threaded bolt 7 is coaxially disposed and fixedly secured inside the tube body 4, as by a hexagonal bolt head 8 molded and anchored into the plug base 5. The hexagonal bolt head 8 prevents rotation of the bolt 7 in the plug base 5, and other equivalent non-rotating bolt head means to head 8 can be utilized, such as a flat bolt head 8. An open annular cylindrical volume 9 is disposed between the bolt 7 and the tube body 4. The bolt 7 has a bolt terminus 10 disposed substantially below the exterior face of the flat flange lip 6, providing an insertion distance 12 for the metal expander bolt 13. The expander bolt 13 has a tapered insertion tip 14, whose tapered distance 15 provides means of threading the expander bolt 13 onto the bolt terminus 10, utilizing the internally threaded sleeve 16 of expander bolt 13. Thus, the threading of sleeve 16 onto bolt 7 begins before the expansion process on the tube body 4, at the tip 14 of bolt 13.

The exterior diameter 17 of the tube body 4 is adapted and sized to be 0.001 to 0.002 inch less than the internal diameter 18 of tube 2, prior to the expansion of tube body 4. The external diameter 19 of the expander bolt 13 is adapted and sized to be 0.004 to 0.010 inch larger diameter than the internal diameter 20 of the tube body 4. The plug body 4 is typically 2½ to 3 inch long, and the bolt terminus 10 is typically ¼ to ⅜ inch below the flange face 11. The expander bolt 13 has a flat flange head 21 whose diameter is equivalent to the diameter of flat flanged lip 6. A recessed wrench aperture 22 provides a means for turning the internal threaded sleeve 16 of the expander bolt 13 on the threaded bolt 7. An equivalent turning means to aperture 22 can provide other turning means 22.

Figure 2:
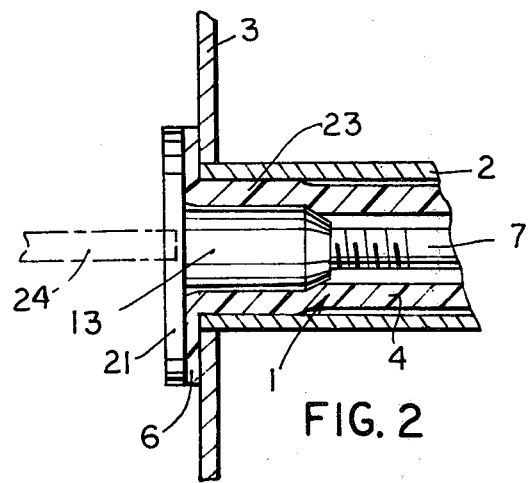
FIG. 2 is a partial sectional view of the same elevational view of FIG. 1 after expansion of the condenser plug in the condenser tube.

Operationally, the fluorocarbon condenser plug 1 seals a condenser tube 2 by an expansion and extrusion process, as is illustrated in detail in FIG. 2. On insertion of the tapered tip 14 of the expander bolt 14 into the tube body 4, and threading the tip 14 on the terminus 10 of bolt 7, the expansion of the polyfluorocarbon plastic tube body 4 is begun. On threading the expander bolt 13 to its full depth on the bolt 7, the thermoplastic tube body 4 is expanded and cold-extruded in the tube body sectional length 23, as a result of forcing the slightly oversize diameter 19 of expander bolt 13 into the slightly undersize tube body diameter 20, utilizing an Allen wrench 24 to turn the bolt 13. The expanded and extruded fluorocarbon tube body 4 fills and seals the condenser tube 2, providing a condenser tube plug.

The polyfluorocarbon plastic utilized in forming the tube 4 can be a polytetrafluoro-ethylene, a polytrifluorocarbon or other polymer adapted to conform to the mechanical and thermal stresses for a specific condenser plug thermoplastic cold flow sealing operation.

The selected polymer should not slowly deform at the condenser operating temperature. A pair of condenser plugs oppositely disposed in a single condenser tube can seal the single tube against tube leaks.

Figure 3:
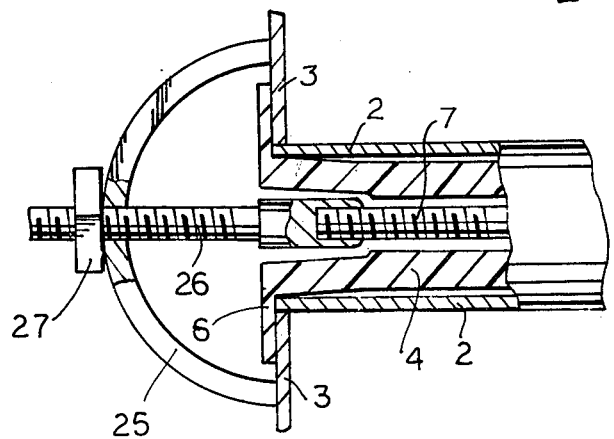
FIG. 3 is a partial sectional view of the condenser plug of FIG. 2 in the process of removal with a plug extractor.
Figure 4:
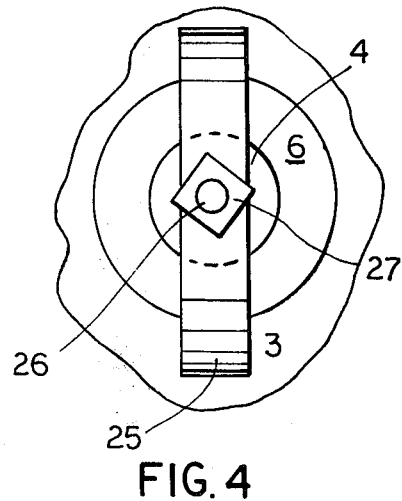
FIG. 4 is a view through 4—4 of FIG. 3.

FIGS. 3 and 4 together illustrate the conventional means of removing a sealed condenser plug from a condenser tube, utilize an extractor strong back 25 having a jackscrew 26 and a rotating nut 27 disposed on the jackscrew 26.

Many modifications in the polyfluorocarbon condenser plug can be made in the light of my teachings. It is understood that within the scope of the claims, the invention can be practiced otherwise than as described.

I claim:

1. In a condenser plug for a condenser tube, the combination comprising:

a cylindrical external tube body having a thermoplastic polymer composition adapted to thermoplastic cold flow extrusion and sealing at the condenser tube operational conditions, said tube body having a coaxial flat flange lip at one tube terminus and an integral plug base at the second tube body terminus, said tube body having a threaded bolt coaxially disposed inside said tube body, said threaded bolt having a bolt head disposed in said integral plug base and fixed in position, said bolt having a bolt terminus adaptively disposed substantially below the exterior face of said coaxial flat flanged lip of said tube body, said threaded bolt and said tube body adaptively sized to provide an annular cylinder volume there between, and, a cooperative metal expander bolt having a tapered insertion tip and an internally threaded sleeve adaptively providing a means of threading said threaded sleeve onto said bolt terminus, said expander bolt having a flat flange head whose diameter is not greater than the diameter of said coaxial flat flanged lip of said tube body, said expander bolt having an exterior bolt diameter adaptively sized to provide thermoplastic cold flow expansion and extrusion of said polymer composition to conform to the mechanical and thermal stresses for a specific cold flow sealing operation, sealing said condenser tube.

2. In the combination set forth in claim 1, the further modification wherein said polymer is a polytetrafluoroethylene.

3. In the combination set forth in claim 1, the further modification wherein said polymer is a polytrifluorocarbon.

* * * * *